United States Patent [19]

Akiyoshi et al.

[11] Patent Number: 4,797,691

[45] Date of Patent: Jan. 10, 1989

[54] SIDE PRINTING HEAD ASSEMBLY

[75] Inventors: Nobuyasu Akiyoshi; Shigehisa Shimizu, both of Kanagawa, Japan

[73] Assignee: Fuji Photo Film Co., Ltd., Kanagawa, Japan

[21] Appl. No.: 85,633

[22] Filed: Aug. 13, 1987

[30] Foreign Application Priority Data

Aug. 13, 1986 [JP] Japan ................................ 61-190008

[51] Int. Cl.$^4$ .......................... G01D 9/42; G02B 6/26
[52] U.S. Cl. ...................................... 346/108; 355/40; 350/96.15; 350/96.20
[58] Field of Search .................. 346/107 R, 108, 76 L; 350/96.20, 96.15; 355/40

[56] References Cited

U.S. PATENT DOCUMENTS 4,544,259 10/1985 Kanaoka ................................ 355/40
4,585,300 4/1986 Landis ................................ 350/96.2
4,590,492 5/1986 Meier ................................ 346/107 R Primary Examiner—E. A. Goldberg
Assistant Examiner—Mark Reinhart
Attorney, Agent, or Firm—Young & Thompson

[57] ABSTRACT

A side printing head assembly for printing marks such as characters, symbols, or the like on a moving photographic film includes a light source comprising a plurality of LED units each of which has a plurality of LED elements emitting a plurality of different monochromatic lights. Light guide members are provided, as many as the plurality of LED units, for directing light from the plurality of LED units toward the moving photographic film. There is a driving circuit for driving the plurality of LED units independently from one another so as to form and thereby to print the mark on the moving photographic film.

6 Claims, 4 Drawing Sheets

B · · · BLUE LED ELEMENT
G · · · GREEN LED ELEMENT
R · · · RED LED ELEMENT

SIDE PRINTING HEAD ASSEMBLY

BACKGROUND OF THE INVENTION

The present invention relates to a side printing head assembly which, in photographic film manufacturing processes, prints characters, symbols or the like on the marginal portion of film web, and more particularly to a side printing head assembly which applies a multicolor exposure light to the marginal portion of film web.

Side printing head assemblies are usually used in the manufacture of photographic film to apply latent images of information such as manufacturer's name, product code, frame number, and/or DX bar code along the longitudinal margin or margins of a film.

In a conventional side printing assembly, as is shown in FIG. 5, a strip of photographic color film 1 to which a latent image should be applied is transported at a constant speed by means of a roller 2. For an accurate transportation of the film strip 1, the roller 2 is controlled to rotate by a control circuit 4 which receives a signal representative of the number of revolutions of the rotary shaft 2a of the roller 2 through a pulse generator 3. In synchronism with its accurate advance, the photographic color film 1 is exposed.

The exposure is effected by means of a printing head which is comprised by an illumination source 5 having light emitting diodes (which are referred hereinafter to as LEDs) 6, 7 and 8 for red, green and blue, respectively, light guide means 9 comprising a large number of optical fibers for transmitting light from the illumination source 5 to an exposure station, and a focussing lens 11 for focussing the light from the light exit 10 of the light guide means 9 onto the photographic color film 1.

The light guide means 9 is, as is seen in FIG. 5, provided one for each LED 6, 7, 8 for red, green, blue. At the light exit 10, red, green, and blue lights are mixed for each picture element. Due to the provision of the light guide means 9 each having three light incident ends for three colors for each picture element to mix different colors of lights emitted from a plurality of LEDs, a desired color of character or symbol can be printed on the photographic color film in the form of a latent image.

By contrast, in a conventional side printing assembly, the provision of light guides each having only one light incident end for each color gives rise to a problem in that it becomes noticeably difficult to arrange the light guides snugly between the illumination source 5 and the light exit 10 and to form the light exit 10. As a result, the printing head cannot be made small and at a low cost.

Another problem which the conventional side printing assembly encounters is that it can produce either a focussed image of uneven color, or else an unclear image with even color; but it cannot produce a focussed image of even color. Specifically, because of the mixed printing light to which the photographic color film is exposed, unevenness in color occurs when an image is sharply focussed on the photographic color film and, on the other hand, an uunclear image is formed on the photographic color film if steps are taken to avoid unevenness in color.

Moreover, when using optical fiber bundles for the light guide 9, there is a problem of low tight transmittance between the LED and the optical fiber bundle as compared to a single optical fiber. Therefore, if the light guide 9 comprising the optical fiber bundles is snugly arranged between the illumination source 5 and the light exit surface 10, there arises a problem that many fibers are broken and that the light transmitting efficiency is lowered, making it difficult to provide an illumination light with a high luminance. In the conventional side printing assembly in which the light guide has three light incident ends, it is quite difficult to repair or replace a broken light guide.

OBJECTS OF THE INVENTION

It is, therefore, an object of the present invention to provide a side printing assembly in which a light source and light guide means are so simply connected as to provide a sharp multicolor image without unevenness in color.

It is another object of the present invention to provide a side printing assembly which is easily assembled.

SUMMARY OF THE INVENTION

For accomplishing the above objects, the side printing assembly according to the present invention comprises a light source having a plurality of LED units each of which includes a plurality of LED elements emitting different wavelengths of light; light guide members as many in number as the plurality of LED units for directing the light from the plurality of LED units toward a moving photographic material; and means for driving the plurality of LED units independently from one another so as to form and print a particular optical mark on the photographic material.

According to a feature of a preferred embodiment of the present invention, each LED unit is provided with at least four LED elements arranged in a square and is disposed on a light incident surface of a single light guide member. The plurality of LED elements on each LED unit is driven independently from one another so as to provide a desired single color of light. Due to the disposition of the LED elements on the light incident surface of the single light guide member, the side printing head assembly is assembled quite easily and made compact at a low manufacturing cost. Because of the provision of the single light guide member for each LED unit, different color lights can be reliably mixed to provide a uniform color of light. Therefore, an image printed on a photographic material is sharp and free from unevenness in color. Furthermore, the light transmitting efficiency is considerably improved in comparison with the conventional side printing assembly.

DETAILED DESCRIPTION OF THE INVENTION

Figure 1:
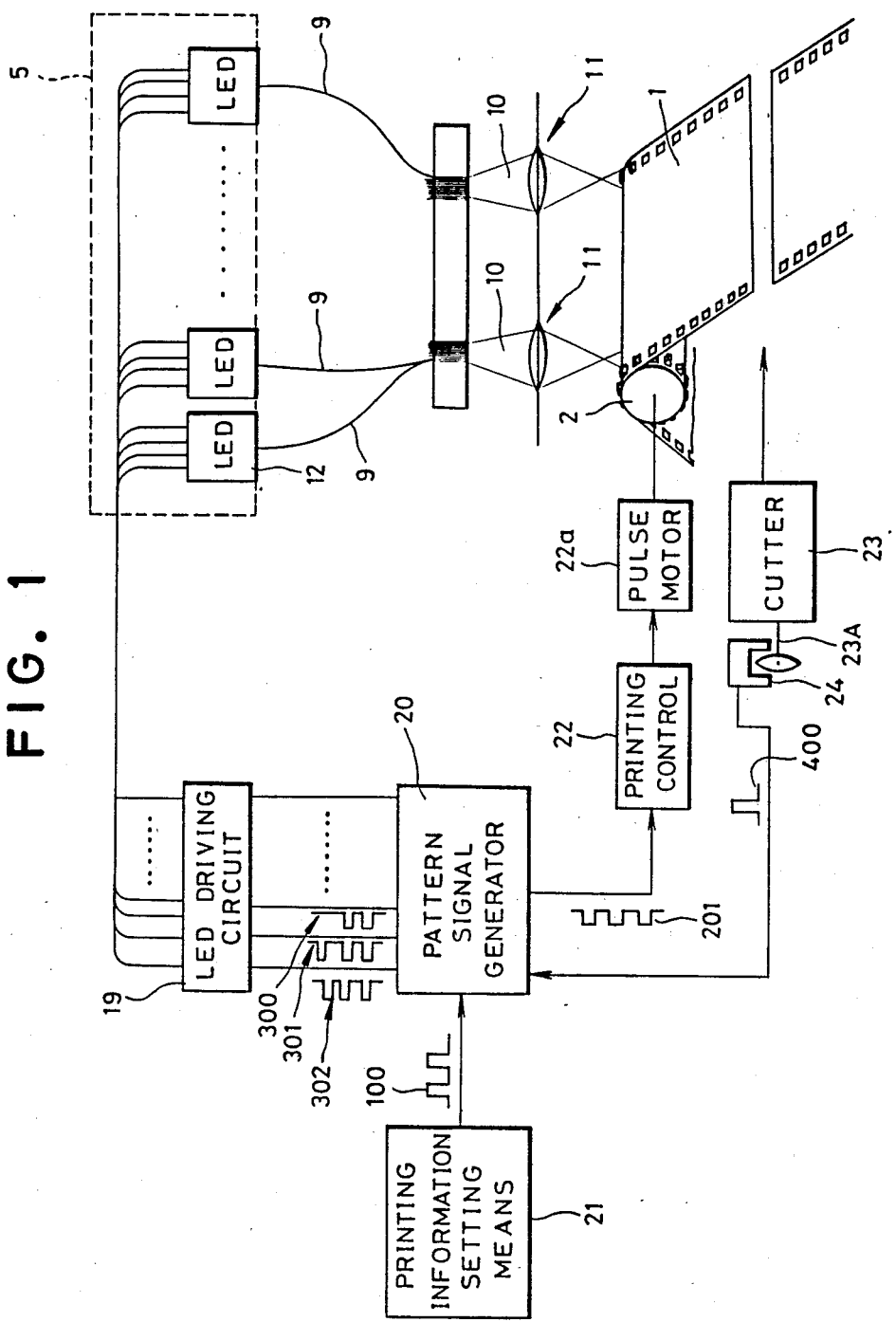
FIG. 1 is a schematic illustration showing a side printing assembly embodying the present invention.

Referring now to the drawings, wherein like numerals denote like parts or elements throughout several views, there is shown diagrammatically in FIG. 1 a side printing assembly suitable for roll film in accordance with the present invention which comprises a light emitting unit 5 including a plurality of LED units 12, a driving circuit 19 for controllably driving the respective LED units 12, a pattern signal generator 20 for providing various pattern signals by which the driving circuit 19 is caused to drive the respective LED units 12 so as to form various patterns of characters and/or symbols to be printed on the photographic color film 1, printing information setting means 21 connected to a computer, and a printing control 22 to which a pulse motor 22a is connected.

Figure 2A:
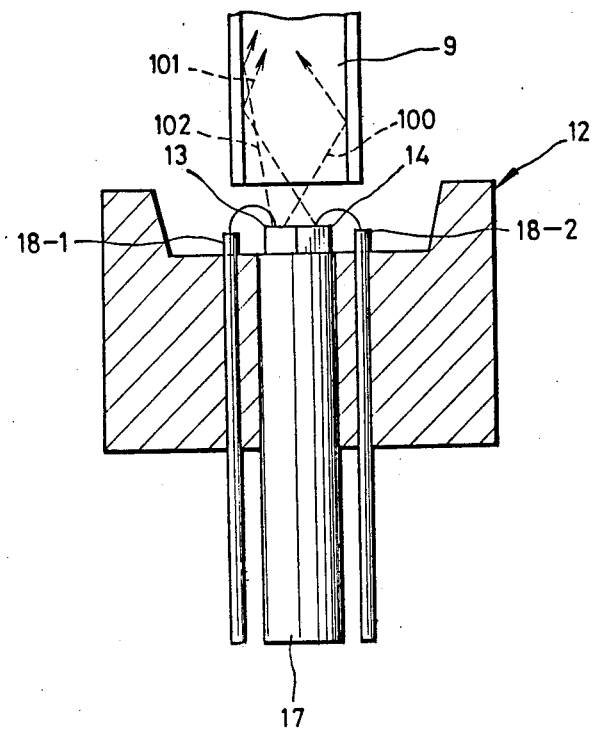
FIG. 2(a) is a sectional view of an LED unit of the side printing head assembly according to the present invention.
Figure 2B:
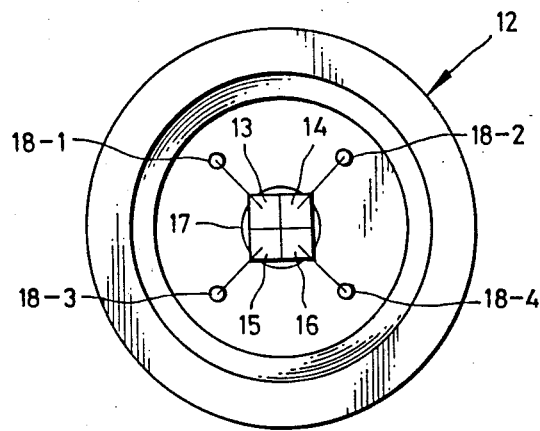
FIG. 2(b) is a plan view of the LED unit of FIG. 1.

As is shown in FIGS. 2(a) and 2(b), each LED unit 12 of the light emitting section 5 comprises a plurality of LED elements 13 to 16 mounted on and electrically connected to a common electrode 17. Each LED element 13, 14, 15, 16 is electrically connected to a respective electrode 18-1, 18-2, 18-3, 18-4 through a thin lead wire. The LED elements 13 to 16 are arranged in the form of a regular square. It should be noted in this embodiment that each LED unit 12 provides blue light from the LED elements 13 and 15, green light from the LED element 14, and red light from the LED element 16. The number of the LED elements of each LED unit 12, the shape of each LED element, and the arrangement of the LED elements may be changed.

Each LED unit 12 forms a single picture element and is optically coupled to an optical light guide member 9. Although a single rod of optical light guide is used in this embodiment, nevertheless an optical fiber bundle comprising a large number of thin optical fibers may instead be used.

Figure 3:
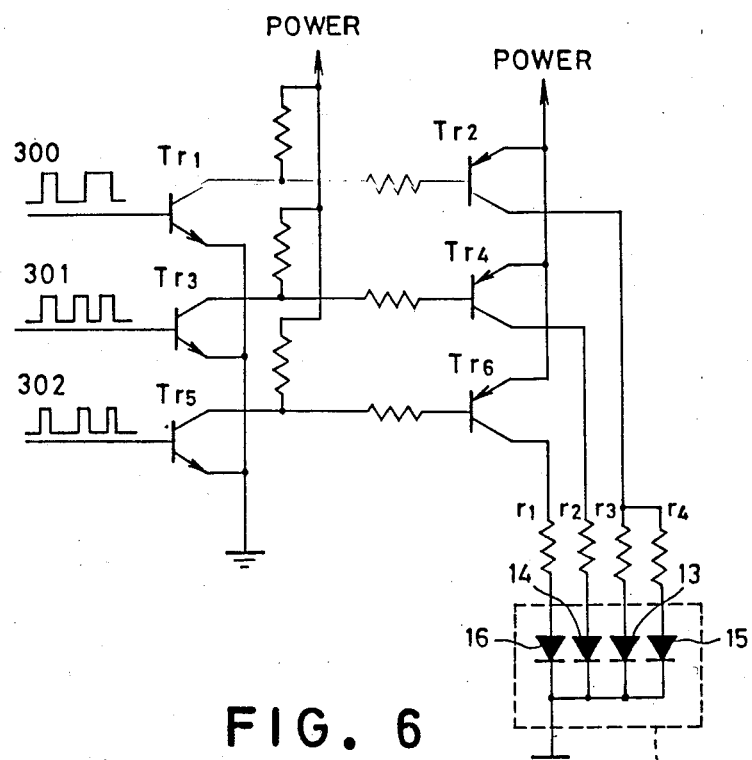
FIG. 3 is a diagram showing a driving circuit for an LED unit.

The driving circuit 19 which is shown in detail in FIG. 3 is provided to control each LED unit 12 to emit light. For driving the LED unit 12, the driving circuit 19 is provided with transistors Tr1 through Tr6 for signal control and resistances r1 through r4 for luminance control. Upon the application of pattern signals 300, 301, and 302 for blue, green and red, respectively, the transistors Tr1 through Tr6 are caused to be conductive or non-conductive to selectively drive the LED elements 13 to 16. For this construction of the LED unit 12, by controlling the time during which the respective LED element emits or does not emit light, the LED unit can produce an illumination light whose color components are desirably controlled. Specifically, as the controlled components of light 100, 101 and 102 from the respective LED elements 13 to 16 enter the light guide member 9 and are mixed therein, a desired color of illumination light is obtained at the exit end of the light guide member 9.

In the operation of the side printing assembly shown in FIG. 1, the necessary printing information is input either through a computer or manually to the printing information setting means 21 to provide data 100 representative of, for example, characters, character-to-character distance, the color of the characters, and so on. The data 100 is sent to the pattern signal generator 20. The pattern signal generator 20 receives a print start signal 400 in synchronism with a film cutting operation of a cutter 23. Upon receiving the print start signal 400, the pattern signal generator 20 produces pattern signals 300 to 302 which in turn are sent to the driving circuit 19 and a control signal 201 which in turn is sent to the printing control 22, these signals 201 and 300 to 302 being simultaneous. The print start signal 400 is produced once every film cutting operation of the film cutter 23. For producing the print start signal 400, there is an angle detector 24 in juxtaposition with a driving shaft 23A of the film cutter 23, which shaft is so designed as to make one revolution every cutting operation of the film cutter 23. On the other hand, the pattern signal generator 20 produces the control signal 201 and the pattern signals 300 to 302, simultaneously. Due to the simultaneous production of the signals 201 and 300 to 302, the side printing is made possible in synchronism with the advance of the film. Specifically, the printing control 22 makes the pulse motor 22A rotate so as to rotate the roller 2 through a rotational angle proportional to the number of control signals applied to the printing control 22. Each pattern signal 300, 301, 302 is sent to the driving circuit 19 wherein it is amplified by the transistor Tr1 through Tr6 with a predetermined amplification factor and then applied to each LED element 13 to 16. As a result, the film is exposed to a required color of light at a desired location for a required time. By using and controlling a plurality of such the LED units, any pattern can be formed and printed on the film.

Figure 6:
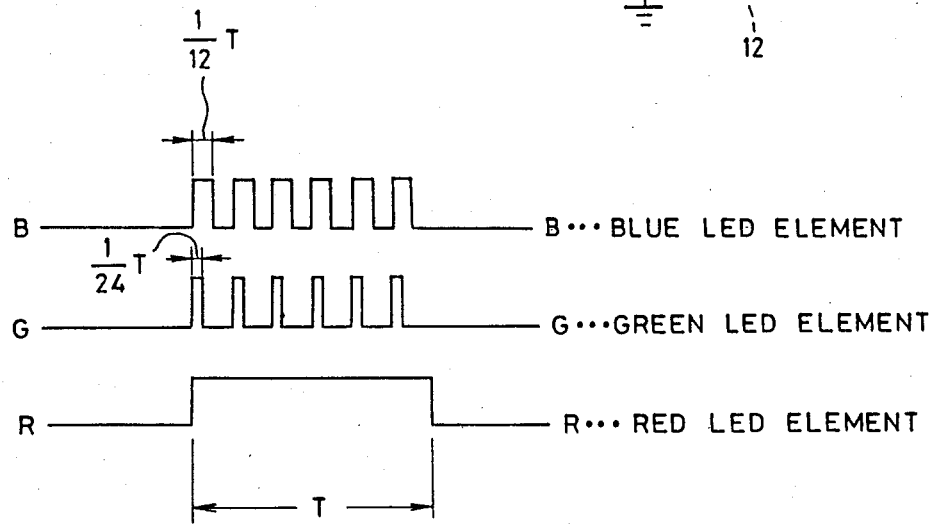
FIG. 6 is a diagram showing light emitting patterns of LED elements.

The color of a latent image formed on the film 1 is regulated by controlling the driving time of each LED element. If a color has the three color components, namely red, blue and green, of light in the ratio of 1:1.5:0.25, the respective LED elements for blue, green and red are controlled to emit light as shown in FIG. 6. Specifically, the LED element 16 for red is driven to emit light for a total time twice as long as the LED elements 13 and 15 for blue and four times as long as the LED element 14 for green. Color density depends on the light emitting time T.

According to controls of the driving circuit 19, monochromatic or mixed color lights from the LED units 12 are mixed by the respective light guide members 9 during transmission to the light exit 10. As a result, the light from the light exit 10 is uniform in color. A mark formed by the LED units 12 and transmitted to the light exit 10 is focussed on the film 1 at its portion to be exposed, by the lens 11 to form a latent image thereon. In the same way, any form of image with a desired color and density can be formed on a film in accordance with the type and size of the film.

Figure 4:
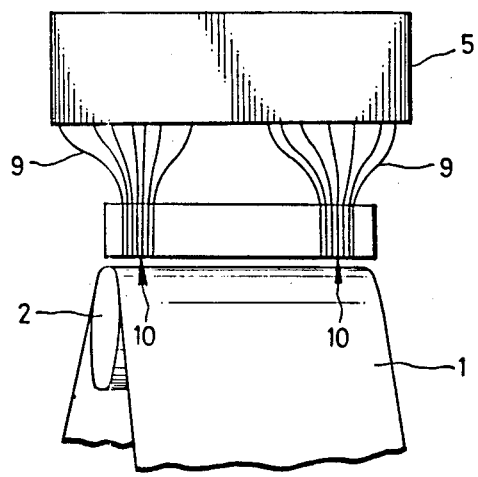
FIG. 4 is an illustration showing another embodiment of the present invention.
Figure 5:
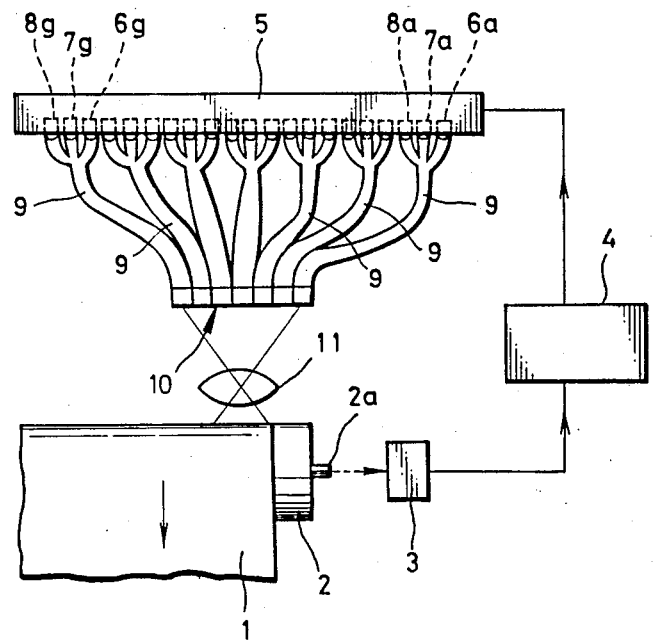
FIG. 5 is a schematic illustration of a conventional side printing assembly.

FIG. 4 shows another embodiment of the side printing head assembly according to the present invention wherein no image focussing lens is used. In this embodiment, the light exit 10 is disposed sufficiently close to the film to make a direct exposure.

Although, in the above-illustrated embodiment, the LED unit is controlled to emit light with the aid of the control signal for advancing the film, nevertheless it is permissible to use signals depending on the position of the film. In the case of an assembly without a cutting device, the print start signal may be replaced by a signal by which the assembly is actuated.

What is claimed is:
1. A side printing head assembly for printing an optical mark on a photographic material comprising:
   a light source comprising a plurality of LED units each of which comprises a plurality of LED elements arranged in a planar array, each of said LED elements emitting one of a plurality of different monochromatic lights;

light guide members as many as said plurality of LED units and superimposed adjacent said array of LED elements of each LED unit, respectively, for directing light from said LED units toward said moving photographic material; and means for driving the LED elements of each of said plurality of LED units independently of each other so as to provide a desired color and amount of light for printing said optical mark on said photographic material.

2. A side printing head assembly as defined in claim 1, wherein each of said plurality of LED units is disposed on a light incident end of said light guide member.

3. A side printing head assembly as defined in claim 1, each of said plurality of LED units including at least four said LED elements each of which emits one of red, green and blue and of which at least two said elements emit the same color.

4. A side printing head assembly as defined in claim 3, said plurality of LED units including at least two LED elements for blue.

5. A side printing head assembly as defined in claim 1, wherein each said light guide member is a single optical fiber having a square-shaped light exit end.

6. A side printing assembly as defined in claim 1, wherein light exit ends of said light guide members are arranged in a line disposed perpendicularly to a moving direction of said photographic material.

* * * * *